United States Patent
Kuo

(10) Patent No.: US 9,470,301 B2
(45) Date of Patent: Oct. 18, 2016

(54) HARMONIC DRIVE GEAR REDUCTION MECHANISM

(71) Applicant: HIWIN TECHNOLOGIES CORP., Taichung (TW)

(72) Inventor: Chang-Hsin Kuo, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 188 days.

(21) Appl. No.: 14/059,409

(22) Filed: Oct. 21, 2013

(65) Prior Publication Data
US 2015/0107387 A1    Apr. 23, 2015

(51) Int. Cl.
F16H 33/00 (2006.01)
F16H 35/00 (2006.01)
F16H 37/00 (2006.01)
F16H 49/00 (2006.01)

(52) U.S. Cl.
CPC ........ F16H 49/001 (2013.01); Y10T 74/19642 (2015.01)

(58) Field of Classification Search
CPC .................... F16H 2049/003; F16H 49/001
USPC ........................ 74/409, 412 R, 640
See application file for complete search history.

(56) References Cited

U.S. PATENT DOCUMENTS

| | | | |
|---|---|---|---|
| 2,930,254 A * | 3/1960 | Musser et al. | 74/640 |
| 3,667,320 A * | 6/1972 | Robinson | 74/640 |
| 3,996,816 A | 12/1976 | Brighton | |
| 4,776,708 A * | 10/1988 | Carlson | 384/447 |
| 4,823,638 A | 4/1989 | Ishikawa | |
| 4,974,470 A | 12/1990 | Ishikawa | |
| 5,456,139 A | 10/1995 | Aubin | |
| 8,028,603 B2 | 10/2011 | Ishikawa | |
| 2005/0044986 A1* | 3/2005 | Ishikawa | 74/640 |
| 2006/0037430 A1* | 2/2006 | Kiyosawa | F16H 49/001 74/640 |

FOREIGN PATENT DOCUMENTS

| | | |
|---|---|---|
| JP | 49140583 U | 12/1974 |
| JP | 53165179 U | 12/1978 |
| JP | 1994174018 A | 6/1994 |
| JP | 1999094030 A | 4/1999 |
| JP | 2012251603 A | 12/2012 |

* cited by examiner

Primary Examiner — William Kelleher
Assistant Examiner — Jake Cook
(74) Attorney, Agent, or Firm — Wang Law Firm, Inc.

(57) ABSTRACT

A harmonic drive gear reduction mechanism includes a rigid inner spline with 2(n+1) teeth and a tooth module of m, a flexible outer spline inserted in the rigid inner spline has 2n teeth and a tooth module of m, a flexible bearing inserted in the flexible outer spline, and a wave generator inserted in the flexible bearing. A thickness between an inner diameter of the flexible bearing and a pitch diameter of the flexible outer spline is t, a cross sectional profile of the wave generator consists four curves, the first and third curves have a radius of curvature R, R=m (n+1)−t, a central angle of the first and third curves is k, and 10<k≤60, the second and fourth curves and conjunction points between the second, fourth curves and the first, third curves can be first-order differentiated.

7 Claims, 10 Drawing Sheets

HARMONIC DRIVE GEAR REDUCTION MECHANISM

BACKGROUND OF THE INVENTION

1. Field of the Invention

The present invention relates to a gear reduction mechanism, and more particularly to a harmonic drive gear reduction mechanism.

2. Description of the Prior Art

FIG. 1 shows a conventional harmonic drive gear reduction mechanism disclosed in U.S. Pat. No. 7,178,427 B, which comprises a rigid inner spline 11, a flexible outer spline 12 disposed in the rigid inner spline 11, a flexible bearing 13 disposed in the flexible outer spline 12, and a wave generator 14 disposed in the flexible bearing 13. When the wave generator 14 rotates, it pushes against and makes the flexible bearing 13 and the flexible outer spline 12 deform, and as a result, the teeth at different parts of the deformed flexible outer spline 12 will be engaged with the teeth of corresponding part of the rigid inner spline 11, furthermore, the flexible outer spline 12 has less teeth than the rigid inner spline 11, so that a rotation speed reduction is achieved.

Since the wave generator 14 is elliptical, the flexible outer spline 12 driven by the wave generator 14 will also be deformed into an elliptical shape. However, the rigid inner spline 11 is circular, which makes the flexible outer spline 12 only engage at two points with the rigid inner spline 11, namely, only a few teeth are engaged, hence, the contact pressure and torque applied to each tooth are relatively big.

Many types of tooth, as shown in FIGS. 2-6, have been studied in the past in order to increase the number of teeth, however, the male tooth 15 and the female tooth 16 are much different in configuration from each other, which results in a relatively small contact area, large contact pressure and severe abrasion for each tooth, for example, the conventional harmonic drive gear reduction mechanism disclosed in U.S. Pat. No. 3,996,816 B as shown in FIG. 2, FIG. 3 shows a conventional harmonic drive gear reduction mechanism disclosed in U.S. Pat. No. 5,456,139 B, FIG. 4 shows a conventional harmonic drive gear reduction mechanism disclosed in U.S. Pat. No. 4,974,470 B, FIG. 5 shows a conventional harmonic drive gear reduction mechanism disclosed in U.S. Pat. No. 4,823,638 B, and FIG. 6 shows a conventional harmonic drive gear reduction mechanism disclosed in U.S. Pat. No. 8,028,603 B.

FIG. 7 shows a conventional harmonic drive gear reduction mechanism disclosed in U.S. Pat. No. 8,011,273 B, and FIG. 8 shows a conventional harmonic drive gear reduction mechanism disclosed in JPU-1978165179, wherein the wave generator 14 is also elliptical, therefore, it also suffers from the disadvantages as mentioned as above.

FIG. 9 shows a conventional harmonic drive gear reduction mechanism disclosed in JPA-1994174018, FIG. 10 shows a conventional harmonic drive gear reduction mechanism disclosed in JPA-1999094030, FIG. 11 shows a conventional harmonic drive gear reduction mechanism disclosed in JPU-1974140583, wherein the part 142 of the wave generator 14 abutting against the elongated shaft 141 is still elliptical, and the radius 143 of the elliptical part 142 is smaller than the diameter 144 of the elongated shaft 141, so that the flexible spline 12 which is driven by the wave generator 14 only engage at two points with the rigid inner spline 11, namely, only a few teeth are engaged. Hence, the contact pressure and torque applied to each tooth are relatively big.

FIGS. 12, 13 show a conventional harmonic drive gear reduction mechanism disclosed in JPA-2012251603, wherein the profile of the wave generator 14 consists of three arc-shaped sections which simulate an ellipse. However, the angle α for the arc-shaped section which has the radius R1 is only 5 degrees, therefore, the structural strength of the wave generator is limited.

The present invention has arisen to mitigate and/or obviate the afore-described disadvantages.

SUMMARY OF THE INVENTION

The primary objective of the present invention is to provide a harmonic drive gear reduction mechanism capable of increasing the number of engaged teeth, reducing pitch error for each tooth, and enhancing transmission accuracy.

Another objective of the present invention is to provide a harmonic drive gear reduction mechanism capable of increasing the torque to be transmitted by increasing the number of engaged teeth.

Another objective of the present invention is to provide a harmonic drive gear reduction mechanism, wherein the profile of the wave generator can be first-order differentiated, which allows the flexible bearing to rotate smoothly.

Another objective of the present invention is to provide a harmonic drive gear reduction mechanism, the teeth of the rigid inner spline and the flexible outer spline have the same tooth profile, which increases the contact area when the rigid inner spline and the flexible outer spline engage with each other, thus reducing contact pressure of the engaged teeth.

Yet another objective of the present invention is to provide a harmonic drive gear reduction mechanism capable of preventing the roots of the teeth of the rigid inner spline and the flexible outer spline from coming into contact with each other and generating large torque, causing tooth fracture.

To achieve the above objectives, a harmonic drive gear reduction mechanism in accordance with the present invention comprises: a rigid inner spline, a flexible outer spline, a flexible bearing and a wave generator. The rigid inner spline is hollow circular structure provided with $2(n+1)$ teeth and has a tooth module of m. The flexible outer spline is a hollow circular structure inserted in the rigid inner spline and provided with $2n$ teeth and the same tooth module of m as the rigid inner spline. The flexible bearing is a hollow structure inserted in the flexible outer spline. The wave generator is inserted in the flexible bearing. A thickness between an inner diameter of the flexible bearing and a pitch diameter of the flexible outer spline is defined as t, a cross sectional profile of the wave generator consists of a first curve, a second curve, a third curve and a fourth curve, the first and third curves have the same radius of curvature R, it satisfies the equation: $R = m(n+1) - t$, a central angle of the first and third curves is k degrees, and $10 < k \leq 60$, the second and fourth curves can be first-order differentiated, and conjunction points between the second and fourth curves and the first and third curves can also be first-order differentiated.

Preferably, the teeth of the rigid outer spline are involute teeth.

Preferably, the second and fourth curves of the wave generator are semi-elliptical and compressed in an equiangular and equal proportion manner.

Preferably, $20 \leq k \leq 40$.

Preferably, the second and fourth curves are equiangularly and equiproportionally compressed based on an elliptical equation: $(X^2/R^2 + Y^2/b^2 = 1)$, b is a radius of a minor axis of the wave generator.

Preferably, a coordinate for any arbitrary point on the second and fourth curves is {X(θ), Y(θ)}, and it satisfies the relations:

$$X(\theta)=R\cos\left[(\theta-\alpha)\pi/(\pi-2\alpha)\right];$$

$$Y(\theta)=b\sin\left[(\theta-\alpha)\pi/(\pi-2\alpha)\right];$$

α is half of the central angle k of the first or third curve.

Preferably, the first and third curves are symmetrical with respect to the center of the wave generator, and the second and fourth curves are also symmetrical with respect to the center of the wave generator.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
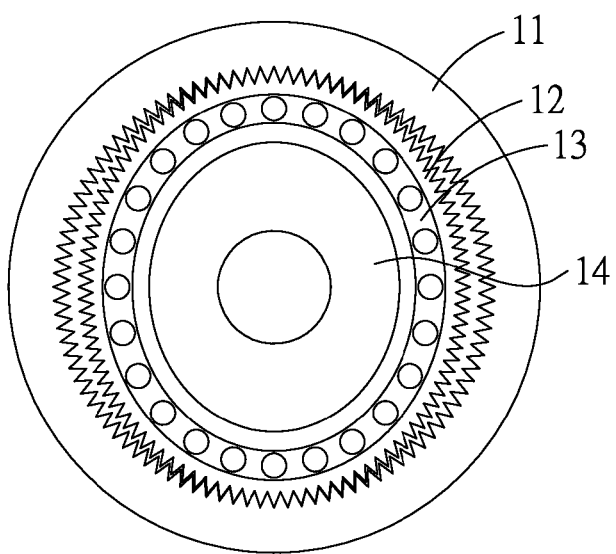
FIG. 1 shows a conventional harmonic drive gear reduction mechanism disclosed in U.S. Pat. No. 7,178,427 B.
Figure 2:
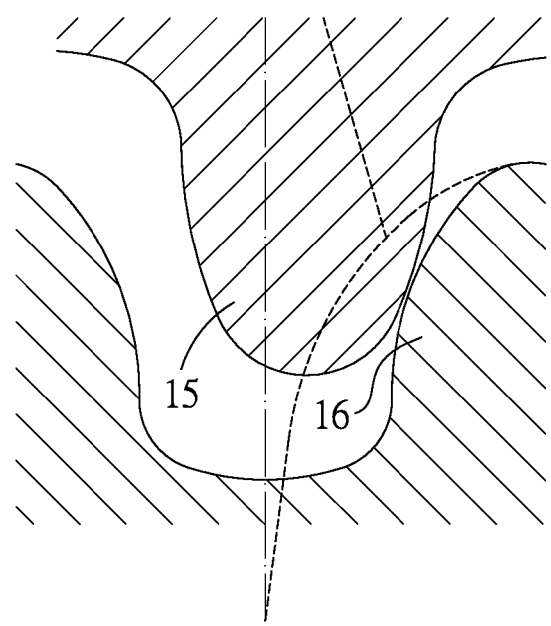
FIG. 2 shows another conventional harmonic drive gear reduction mechanism disclosed in U.S. Pat. No. 3,996,816 B.
Figure 3:
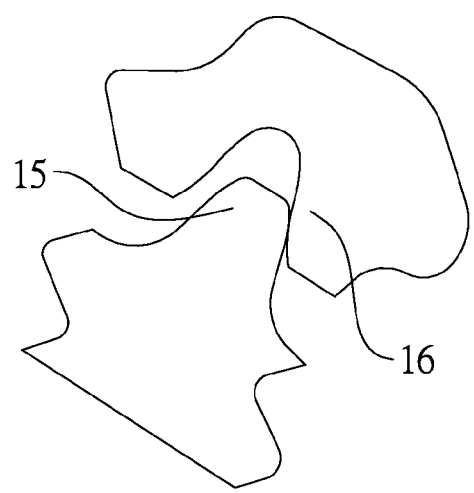
FIG. 3 shows a conventional harmonic drive gear reduction mechanism disclosed in U.S. Pat. No. 5,456,139 B.
Figure 4:
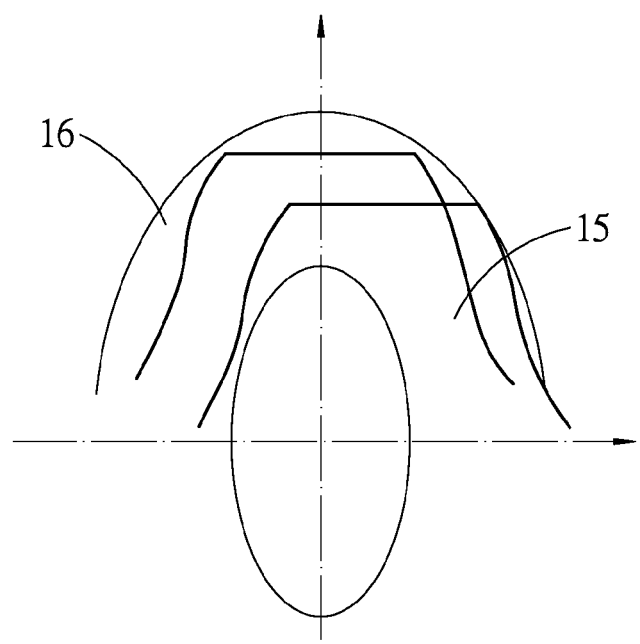
FIG. 4 shows a conventional harmonic drive gear reduction mechanism disclosed in U.S. Pat. No. 4,974,470 B.
Figure 5:
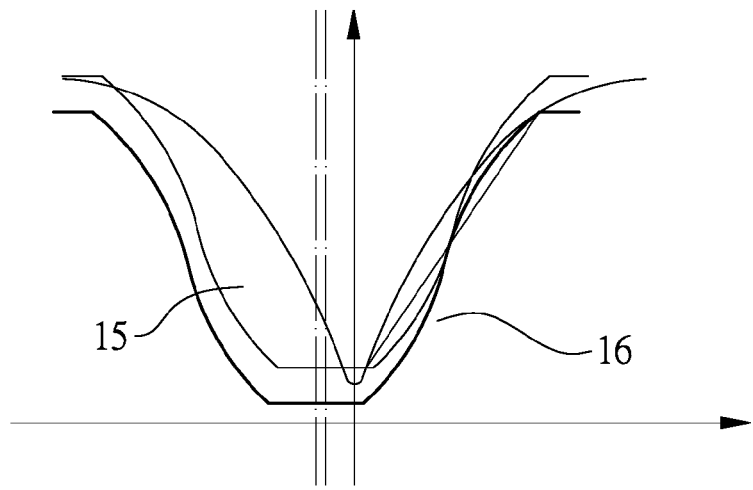
FIG. 5 shows a conventional harmonic drive gear reduction mechanism disclosed in U.S. Pat. No. 4,823,638 B.
Figure 6:
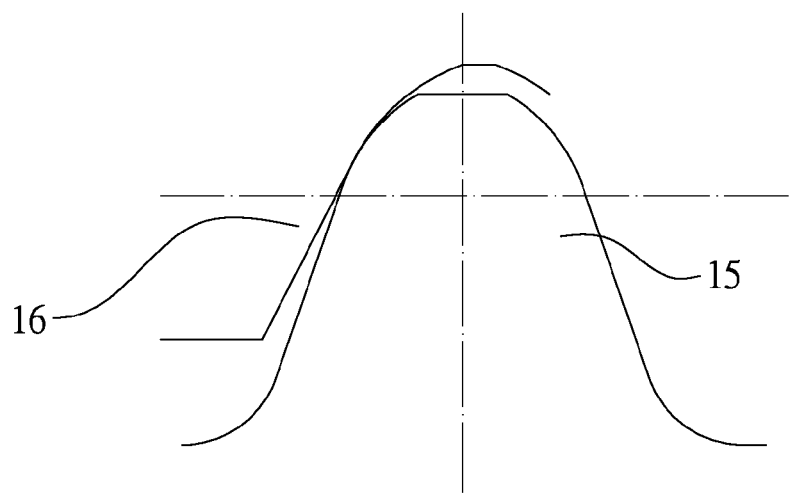
FIG. 6 shows a conventional harmonic drive gear reduction mechanism disclosed in U.S. Pat. No. 8,028,603 B.
Figure 7:
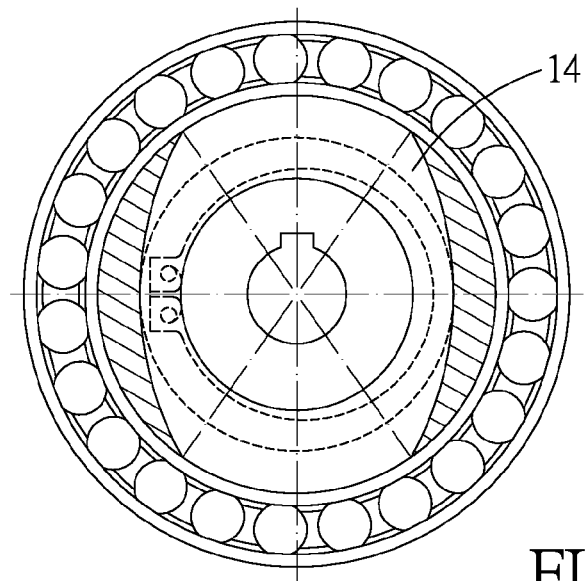
FIG. 7 shows a conventional harmonic drive gear reduction mechanism disclosed in U.S. Pat. No. 8,011,273 B.
Figure 8:
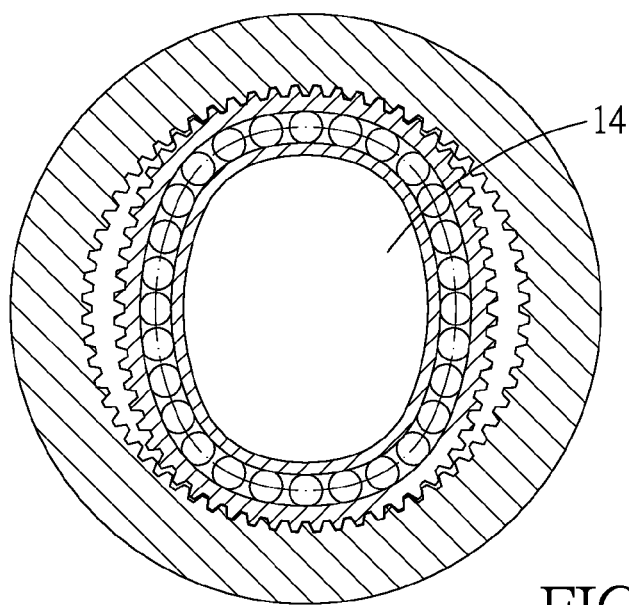
FIG. 8 shows a conventional harmonic drive gear reduction mechanism disclosed in JPU-1978165179.
Figure 9:
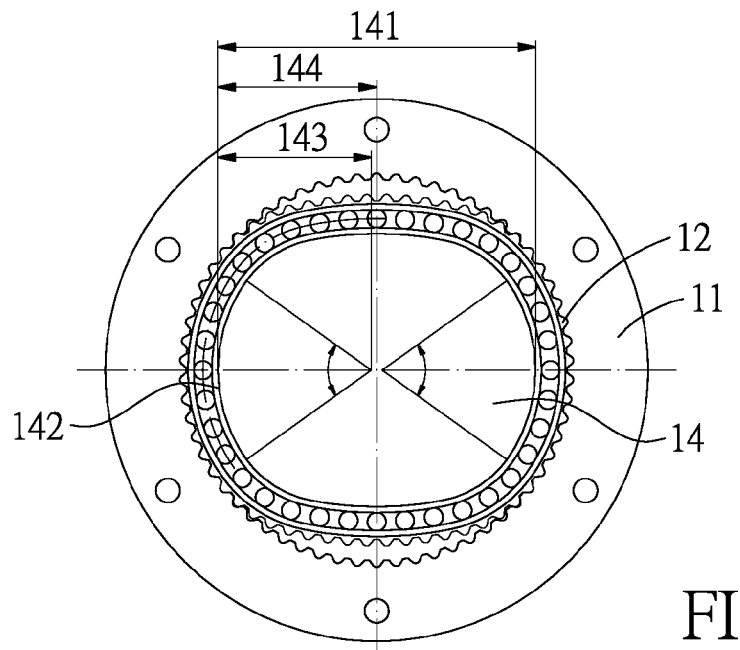
FIG. 9 shows a conventional harmonic drive gear reduction mechanism disclosed in JPA-1994174018.
Figure 10:
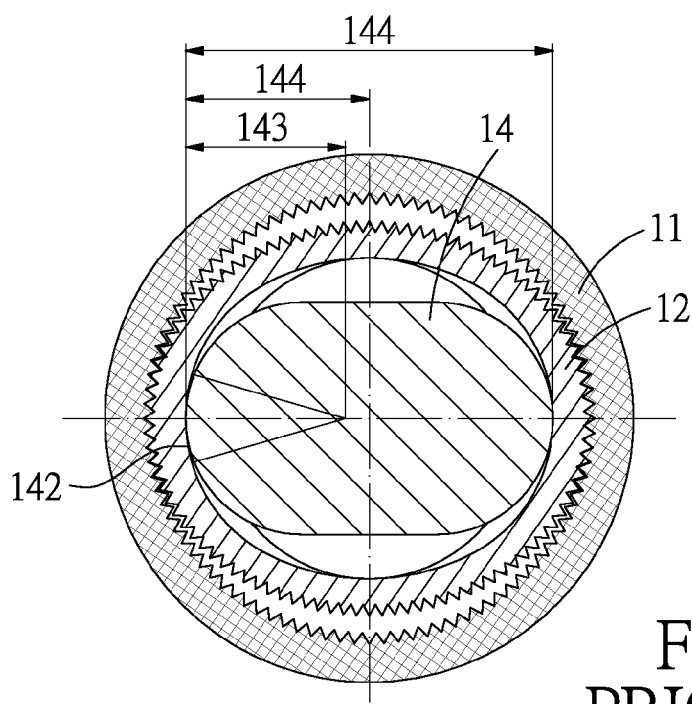
FIG. 10 shows a conventional harmonic drive gear reduction mechanism disclosed in JPA-1999094030.
Figure 11:
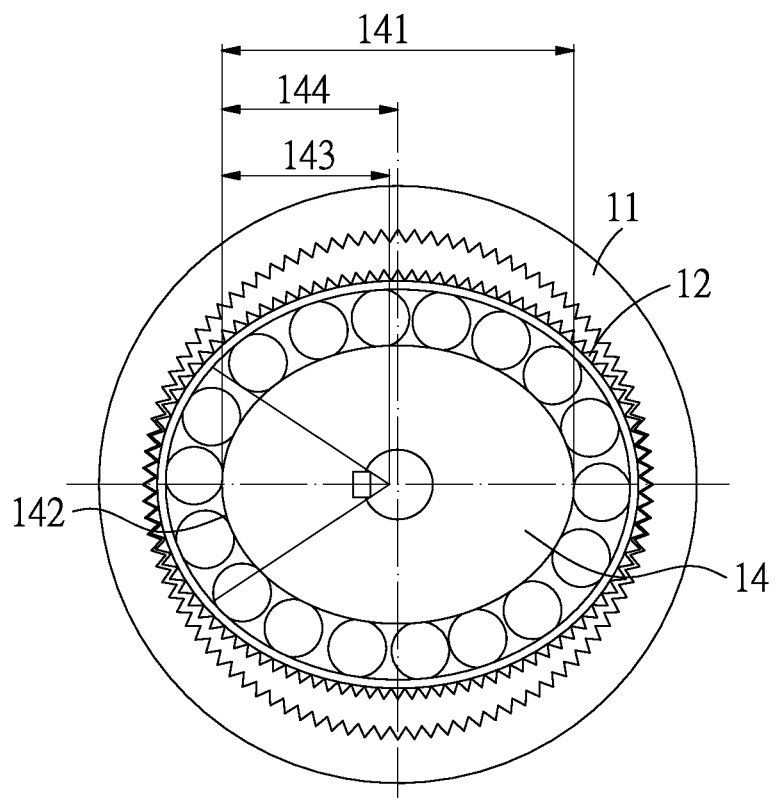
FIG. 11 shows a conventional harmonic drive gear reduction mechanism disclosed in JPU-19741405830.
Figure 12:
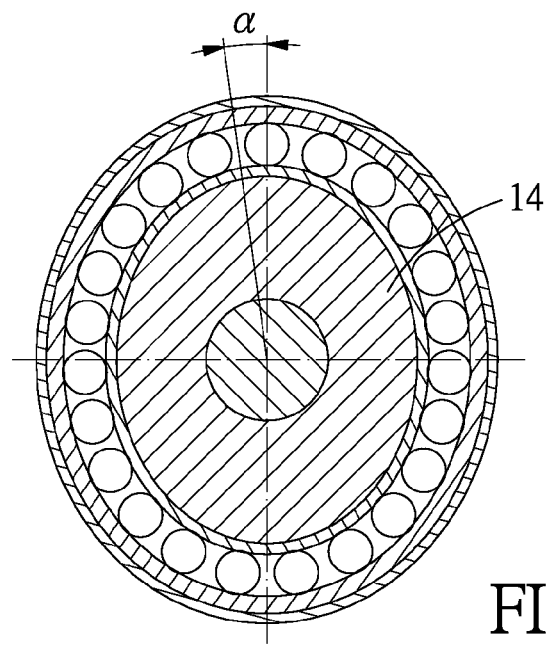
FIG. 12 shows a conventional harmonic drive gear reduction mechanism disclosed in JPA-2012251603.
Figure 13:
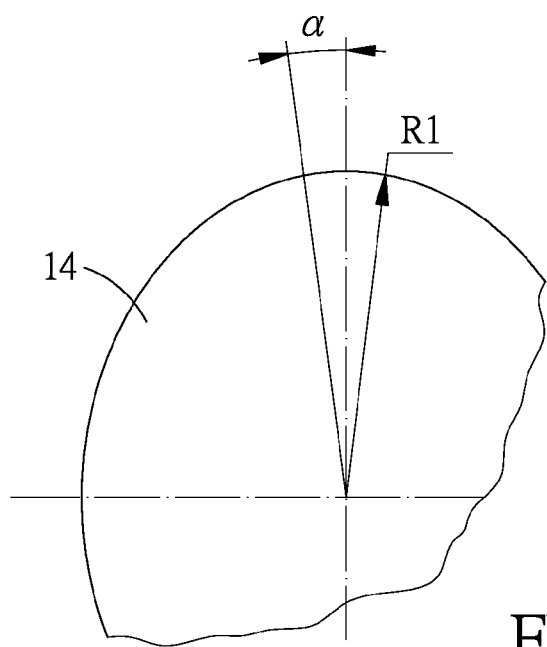
FIG. 13 shows the conventional harmonic drive gear reduction mechanism disclosed in JPA-2012251603.
Figure 14A:
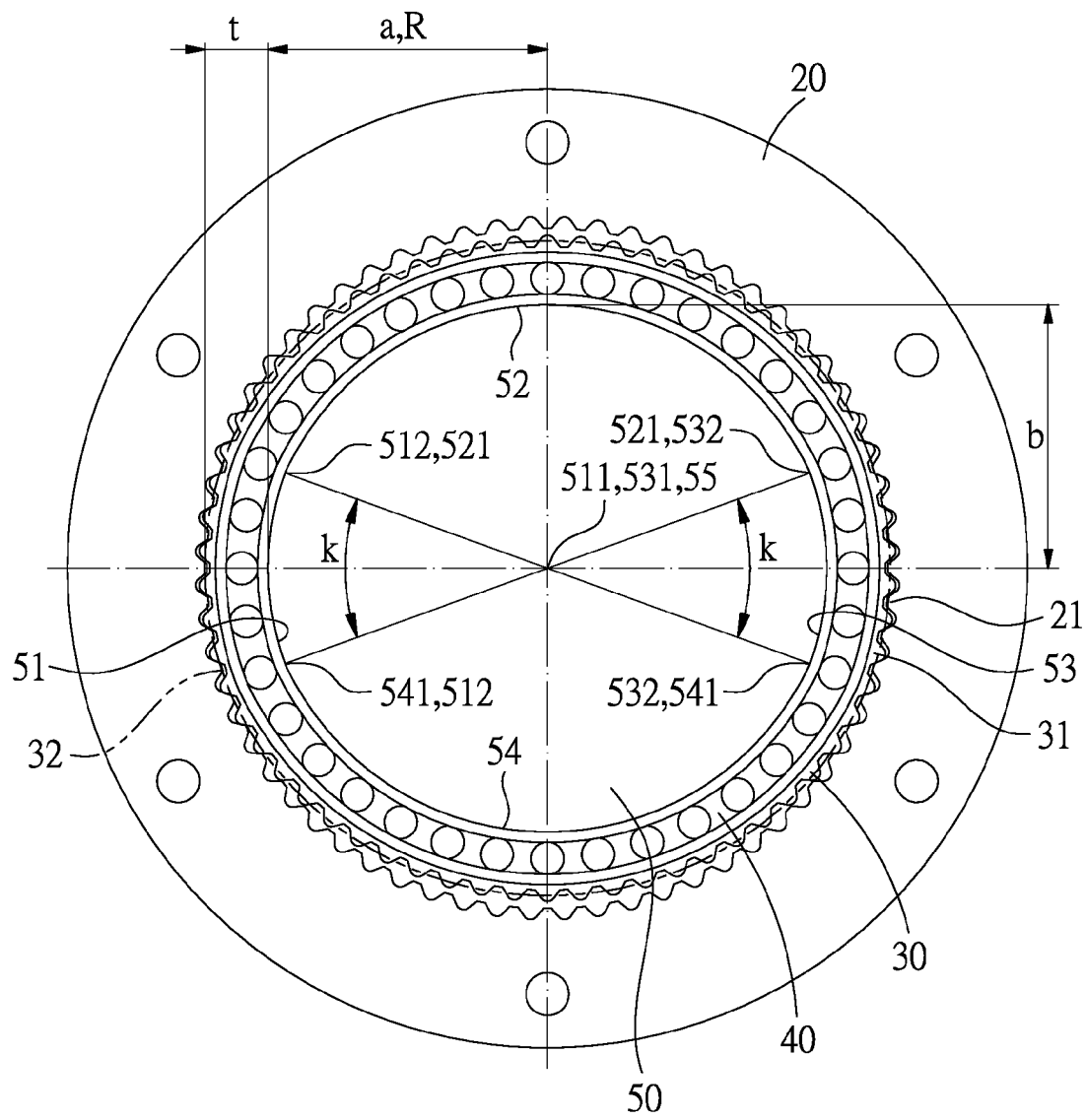
FIG. 14A shows a harmonic drive gear reduction mechanism in accordance with a first embodiment of the present invention.

Referring to FIG. 14A, a harmonic drive gear reduction mechanism in accordance with a first embodiment of the present invention comprises: a rigid inner spline 20, a flexible outer spline 30, a flexible bearing 40 and a wave generator 50.

The rigid inner spline 20 is a hollow circular structure provided with 2(n+1) teeth and has a tooth module of m. In this embodiment, the teeth of the rigid inner spline 20 are involute teeth.

The flexible outer spline 30 is a hollow circular structure inserted in the rigid inner spline 20 and provided with 2n teeth and the same tooth module of m as the rigid inner spline 20. In this embodiment, the teeth of the flexible outer spline 30 are involute teeth, and in a valid area, the rigid inner spline 20 and the flexible outer spline 30 have the same tooth profile. The valid area means the parts of the rigid inner spline 20 and the flexible outer spline 30 which are engaged with each other and excludes the root and crown of the teeth 21, 31 of the rigid inner spline 20 and the flexible outer spline 30.

The flexible bearing 40 is a hollow structure inserted in the flexible outer spline 30.

The wave generator 50 is inserted in the flexible bearing 40, a radius of a major axis of the wave generator 50 is a, and a radius of a minor axis of the wave generator 50 is b.

Figure 15:
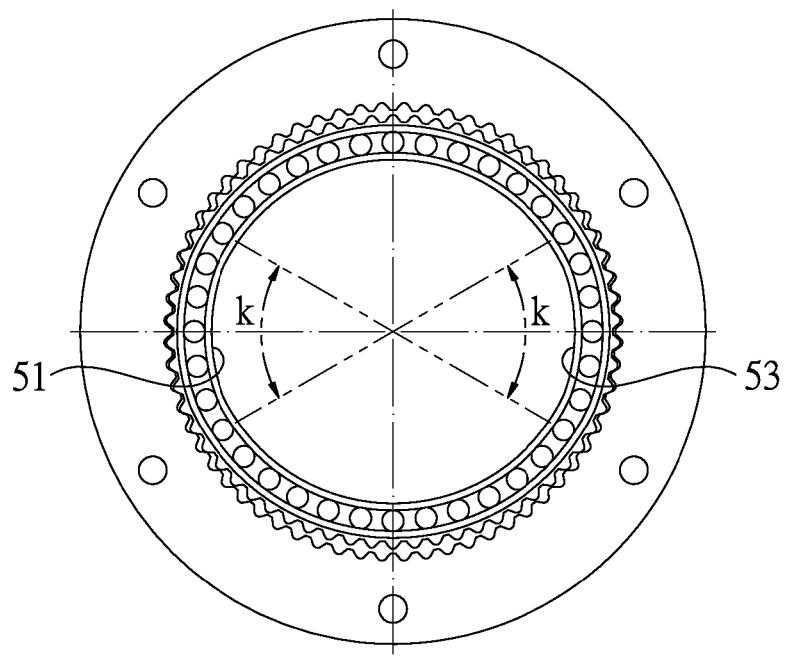
FIG. 15 shows that the central angle of the first and third curves is 60 degrees.
Figure 16:
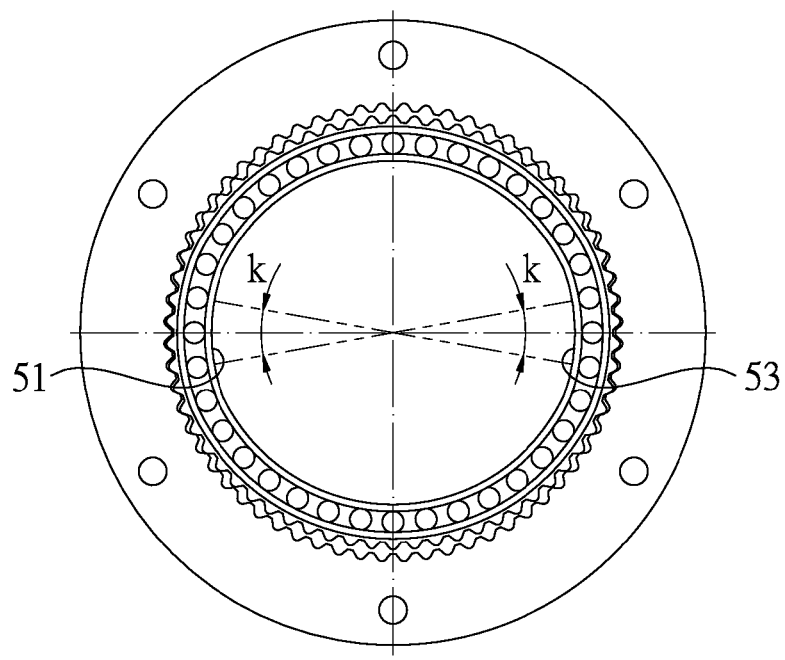
FIG. 16 shows that the central angle of the first and third curves is 20 degrees.

A thickness between an inner diameter of the flexible bearing 40 and a pitch diameter 32 of the flexible outer spline 30 is defined as t. A cross sectional profile of the wave generator 50 consists of a first curve 51, a second curve 52, a third curve 53 and a fourth curve 54. The first and third curves 51, 53 has the same radius of curvature R and has a center 511, 531 located at the center 55 of the wave generator 50. Namely, the radius R of the first and third curves 51, 53 is equal to the radius a of the wave generator 50, and they satisfy the equation: R=m (n+1)−t, wherein b is the radius of the minor axis of the wave generator 50, b<R. To balance the load applied to the flexible outer spline 30, the first and third curves 51, 53 are symmetrical with respect to the center 55 of the wave generator 50, and the second and fourth curves 52, 54 are also symmetrical with respect to the center 55 of the wave generator 50. A central angle of the first and third curves 51, 53 is k degrees, and 10<k≤60, and preferably, 20≤k≤40. In this embodiment, k=40, and it can also be k=60 as shown in FIG. 15, or k=20, as shown in FIG. 16.

The second and fourth curves 52, 54 can be first-order differentiated since they are a curve with a continuous radius of curvature, and the conjunction points 521, 541, 512 and 532 between the second and fourth curves 52, 54 and the first and third curves 51, 53 can also be first-order differentiated, so that the two conjunction points 512, 532 of the first and third curves 51, 53 have the same slope as the two conjunction points 521, 541 of the second and fourth curves 52, 54, namely, the radius of curvature is continuous.

Since the cross sectional profile of the wave generator 50 consists of the first, second, third and fourth curve 51, 52, 53, 54, plus the abovementioned limitations, such as, the first and third curves 51, 53 have the same radius of curvature R and have their centers, 511, 531 located at the center 55 of the wave generator 50, and the central angle k of the first and third curves 51, 53 is 40 degrees, these arrangements will increase the number of engaged teeth (contact ratio) of the rigid inner spline 20 and the flexible outer spline 30, when the wave generator 50 rotates the flexible outer spline 30. Since the number of engaged teeth of the present invention is more than one and much bigger than that of conventional design, the relative angle between the rigid inner spline 20 and the flexible outer spline 30 will be determined by all the engaged teeth rather than being determined by the pitch or profile of a certain tooth. Namely, the relative angle between the rigid inner spline 20 and the flexible outer spline 30 will be determined by average pitch of all the engaged teeth 21, 31. The teeth maybe different in pitch from one another, and the pitch difference will cause transmission angle error. When the angle errors of all the engaged teeth are averaged, the error will be reduced, and therefore, transmission accuracy will be improved.

Furthermore, since the present invention increases the number of engaged teeth between the rigid inner spline 20 and the flexible outer spline 30, when the flexible outer spline 30 is loaded, the load on each tooth will be reduced as compared to the conventional design. Hence, the torque that the harmonic drive gear reduce mechanism can transmit is effectively increased.

It is noted that the cross sectional profile of the wave generator 50 consists of the first, second, third and fourth curve 51, 52, 53, 54, and the second and fourth curves 52, 54 and the conjunction points 521, 541, 512 and 532 between the second and fourth curves 52, 54 and the first and third curves 51, 53 can be first-order differentiated, which allows the flexible bearing 40 to rotate smoothly.

Besides, the teeth of the rigid inner spline 20 and the flexible outer spline 30 are involute teeth, the rigid inner spline 20 and the flexible outer spline 30 have the same tooth profile, except the root and crown of the teeth, which increases the contact area when the rigid inner spline 20 and the flexible outer spline 30 engage with each other, thus reducing contact pressure of the engaged teeth, meanwhile, preventing the roots of the teeth 21, 31 of the rigid inner spline 20 and the flexible outer spline 30 from coming into contact with each other and generating large torque, causing tooth fracture.

Figure 14B:
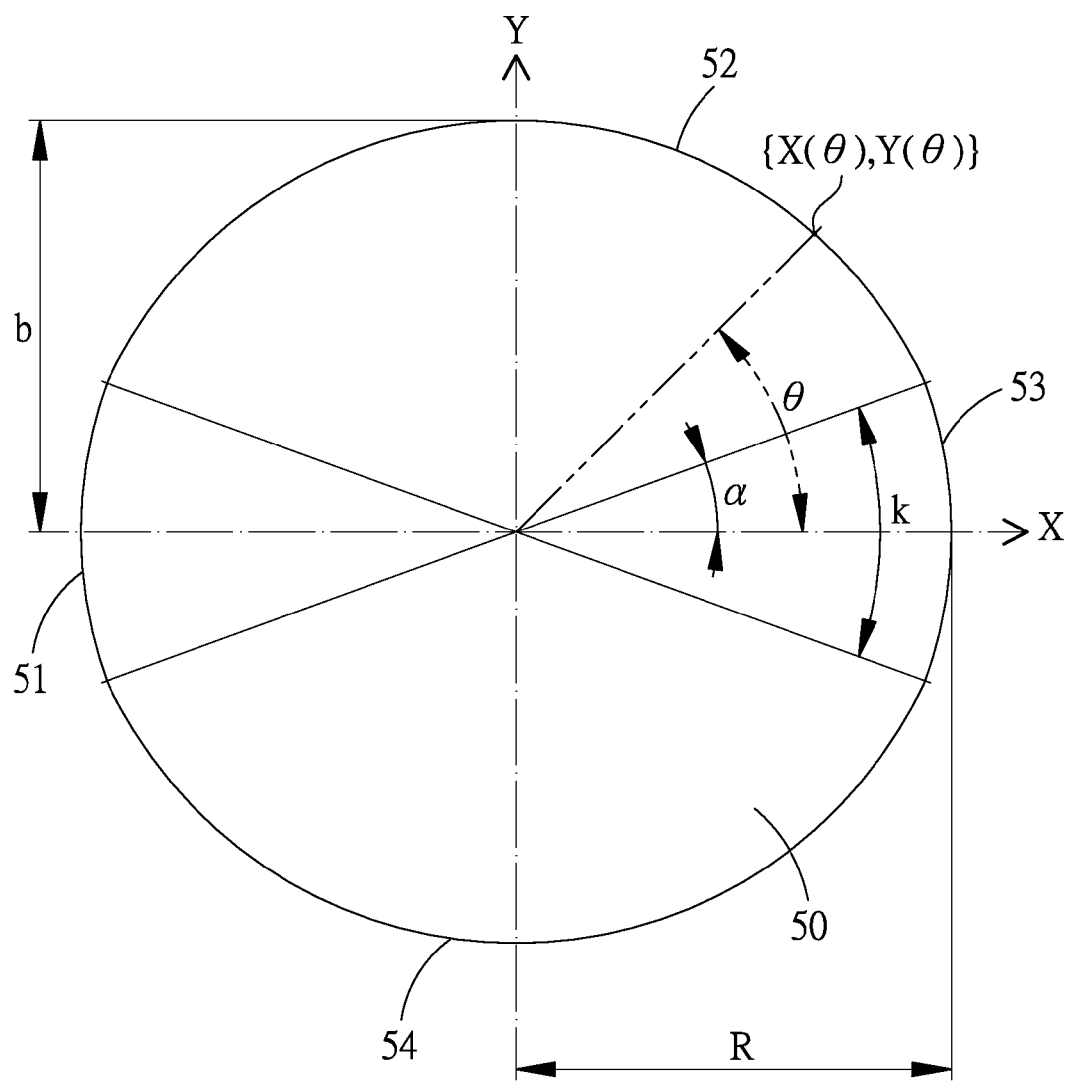
FIG. 14B shows that the second and fourth curves of the wave generator of the present invention are semi-elliptical and compressed in an equiangular and equal proportion manner.

It is to be noted that the second and fourth curves 52, 54 of the wave generator 50 are semi-elliptical and compressed in an equiangular and equal proportion manner, as shown in FIG. 14B, the second and fourth curves 52, 54 are equiangularly and equiproportionally compressed based on the elliptical equation: $(X^2/R^2+Y^2/b^2=1)$. Therefore, a coordinate for any arbitrary point on the second and fourth curves 52, 54 is $\{X(\theta), Y(\theta)\}$, and it satisfies the relations: $X(\theta)=R \cos[(\theta-\alpha)\pi/(\pi-2\alpha)]$; $Y(\theta)=b \sin[(\theta-\alpha)\pi/(\pi-2\alpha)]$; wherein $\alpha$ is half of the central angle k of the first or third curve 51, 53; R is the radius of the major axis of the wave generator 50, and $R=m(n+1)-t$, b is the radius of the minor axis of the wave generator 50, and $b<R$.

While we have shown and described various embodiments in accordance with the present invention, it is clear to those skilled in the art that further embodiments may be made without departing from the scope of the present invention.

What is claimed is:

1. A harmonic drive gear reduction mechanism, comprising:
    a rigid inner spline being hollow circular structure provided with $2(n+1)$ teeth and having a tooth module of m;
    a flexible outer spline being a hollow circular structure inserted in the rigid inner spline and provided with 2n teeth and the same tooth module of m as the rigid inner spline;
    a flexible bearing being a hollow structure inserted in the flexible outer spline; and
    a wave generator inserted in the flexible bearing;
    wherein a thickness between an inner diameter of the flexible bearing and a pitch diameter of the flexible outer spline is defined as t, a cross sectional profile of the wave generator consists of a first curve, a second curve, a third curve and a fourth curve, the first and third curves have a same radius of curvature R, it satisfies the equation: $R=m(n+1)-t$, a central angle of the first and third curves is k degrees, and $10<k<60$, the second and fourth curves can be first-order differentiated, and conjunction points between the second and fourth curves and the first and third curves can also be first-order differentiated;
    the teeth of the flexible outer spline are involute teeth.

2. The harmonic drive gear reduction mechanism as claimed in claim 1, wherein the rigid inner spline and the flexible outer spline, in a valid area, have a same tooth profile.

3. The harmonic drive gear reduction mechanism as claimed in claim 1, wherein the second and fourth curves of the wave generator are formed by shrinking a semi-ellipsoid in an equiangular and equal proportion manner.

4. The harmonic drive gear reduction mechanism as claimed in claim 1, wherein $20 \leq k \leq 40$.

5. The harmonic drive gear reduction mechanism as claimed in claim 1, wherein the second and fourth curves are formed by equiangularly and equiproportionally shrinking a semi-ellipsoid based on an elliptical equation: $(X^2/R^2/b^2=1)$, b is a radius of a minor axis of the wave generator.

6. The harmonic drive gear reduction mechanism as claimed in claim 5, wherein a coordinate for any arbitrary point on the second and fourth curves is $\{X(\theta), Y(\theta)\}$, and it satisfies the relations:

$X(\theta)=R \cos[(\theta-\alpha)\pi/(\pi-2\alpha)]$;

$Y(\theta)=b \sin[(\theta-\alpha)\pi/(\pi-2\alpha)]$;

$\alpha$ is half of the central angle k of the first or third curve.

7. The harmonic drive gear reduction mechanism as claimed in claim 1, wherein the first and third curves are symmetrical with respect to the center of the wave generator, and the second and fourth curves are also symmetrical with respect to the center of the wave generator.

* * * * *